US012188269B2

(12) United States Patent
Zabala Zabaleta et al.

(10) Patent No.: US 12,188,269 B2
(45) Date of Patent: Jan. 7, 2025

(54) LOCKING DEVICE FOR A LOCK

(71) Applicant: OJMAR, S.A., Elgoibar (ES)

(72) Inventors: Jon Zabala Zabaleta, Elgoibar (ES); Jokin Aguirrezabala Olasagasti, Elgoibar (ES)

(73) Assignee: OJMAR, S.A., Elgoibar (ES)

( * ) Notice: Subject to any disclaimer, the term of this patent is extended or adjusted under 35 U.S.C. 154(b) by 162 days.

(21) Appl. No.: 17/988,295

(22) Filed: Nov. 16, 2022

(65) Prior Publication Data

US 2023/0151637 A1 May 18, 2023

(30) Foreign Application Priority Data

Nov. 17, 2021 (ES) ............................ ES202132284U

(51) Int. Cl.
*E05B 9/02* (2006.01)
*E05B 15/04* (2006.01)
*E05B 15/10* (2006.01)

(52) U.S. Cl.
CPC .............. *E05B 9/02* (2013.01); *E05B 15/101* (2013.01); *E05B 2015/0458* (2013.01)

(58) Field of Classification Search
CPC ... E05B 9/00; E05B 9/02; E05B 15/00; E05B 15/10; E05B 15/101; E05B 15/04; E05B 2015/0458; E05B 2015/0468
USPC ................................................................ 40/1
See application file for complete search history.

(56) References Cited

U.S. PATENT DOCUMENTS

2009/0249846 A1* 10/2009 Gokcebay .......... G07C 9/00944 70/279.1
2015/0211258 A1* 7/2015 Gokcebay ................. E05C 1/04 70/278.1
2017/0122006 A1* 5/2017 Zhang ..................... E05B 47/06
2017/0221291 A1* 8/2017 Gokcebay .......... G07C 9/00174

FOREIGN PATENT DOCUMENTS

CN 1827993 A 9/2006
CN 110778220 A * 2/2020
ES 2724005 T3 9/2019
KR 200399006 Y1 10/2005

* cited by examiner

*Primary Examiner* — Nathan Cumar
(74) *Attorney, Agent, or Firm* — The Webb Law Firm

(57) ABSTRACT

A locking device for a lock including a box and a cover, such that the device can be isolated, which box includes therein a motor, a worm screw connected to the shaft of the motor, a locking shaft which is capable of sliding through a hole towards the outside of the box, and an elastic element with two ends, connecting the locking shaft with the worm screw, wherein one end of the elastic element is securely connected to the locking shaft and the other end is inserted between two threads of the worm screw such that, upon activating the motor, the worm screw rotates, moving the elastic element in order to drive the locking shaft, which transitions from being retracted to being extended and vice versa.

3 Claims, 2 Drawing Sheets

LOCKING DEVICE FOR A LOCK

CROSS-REFERENCE TO RELATED APPLICATIONS

This application is claims priority to Spanish Utility Model Application No. U202132284 filed Nov. 17, 2021, the disclosure of which is hereby incorporated by reference in its entirety.

BACKGROUND OF THE INVENTION

Field of the Invention

The present invention relates to a locking device for a lock the configuration and design of which provides it with a versatility that allows the use thereof in locks of reduced dimensions.

It has a particular application in the industrial field relating to locks.

Description of Related Art

In the current state of the art, the use of electronic locks in places such as lockers and cabinets, among others, is increasingly in demand due to the advantages and ease provided by locks of this type for access control and management of user permissions.

One of the problems with locks of this type is that they have to integrate different electronic and mechanical devices despite having a reduced size.

This means that the mechanical and electronic devices for the control and actuation of the lock must have minimum dimensions so that they can be installed in the lock and, at the same time, continue to carry out their corresponding functionality.

One of these mechanical devices are the locking devices, which are in charge of limiting or blocking the movement of other devices of the lock depending on their use (opening, closing, unauthorized permissions, unwanted manipulations, etc.).

Document ES2724005T3 discloses a locking device for locks similar to that of the invention. A box houses a motor axially connected to a worm screw in which there is coupled the end of an activating part which is capable of rotating about a fixed point with respect to the box. The activator incorporates a spring fixed to a locking shaft that slides through an opening of the box to lock or release the lock.

The present invention presents a locking system in which the number of components has been reduced, creating a more simplified locking system without losing effectiveness.

SUMMARY OF THE INVENTION

In order to achieve the objectives and prevent the drawbacks mentioned above, the present invention describes a locking device for a lock comprising a box and a cover, such that the device can be isolated.

The box has located therein:

a motor fixed to the box, a worm screw connected to the shaft of the motor, a locking shaft which is capable of sliding through a hole in the box, and an elastic element with two ends.

One of the ends of the elastic element is securely connected to the locking shaft, whereas the other end is inserted between two threads of the worm screw.

Therefore, upon activating the motor, the worm screw rotates, moving the elastic element which in turn drives the locking shaft so that it transitions from a retracted position to another extended position, and vice versa, going into and coming out of the box through a recess that it has.

The elastic element is preferably made of a metallic material, such that it can withstand the stresses required by the activation of the locking device.

It can also have a curved sheet configuration, like a strip, or be a spring.

BRIEF DESCRIPTION OF THE DRAWINGS

To complete the description of the invention, and for the purpose of helping to make the features thereof more readily understandable, according to a preferred exemplary embodiment thereof, a set of drawings is included wherein, by way of illustration and not limitation, the following figures have been represented.

A list of the references used in the figures is provided below:

1. Box.
2. Cover.
3. Motor.
4. Worm screw.
5. Locking shaft.
6. Elastic element.
F. Shear retention force.
Z. Axial retention force.

DESCRIPTION OF THE INVENTION

The object of the present description relates to a locking device for a lock the configuration and design of which provides it with a versatility that allows the use thereof in locks of reduced dimensions.

Figure 1:
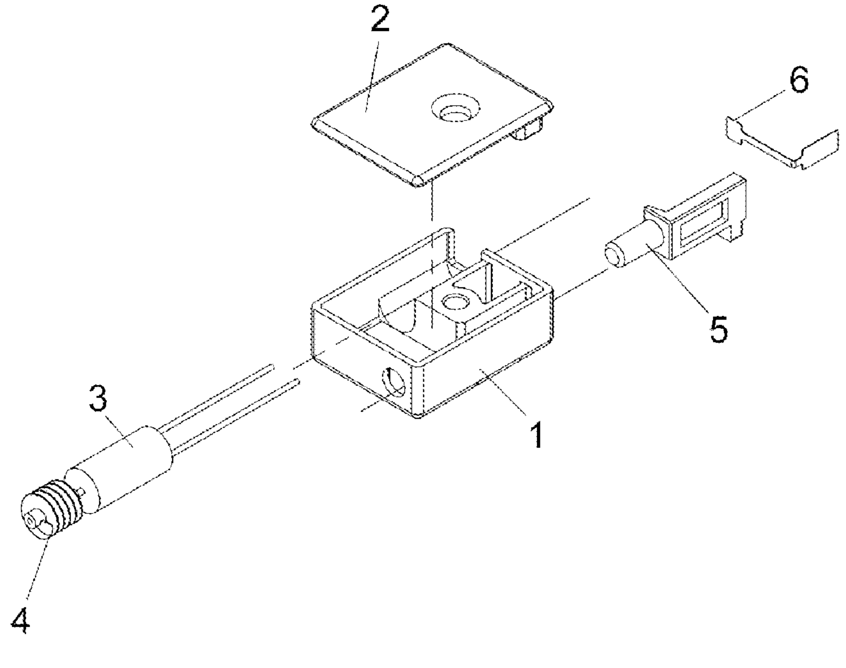
FIG. 1 depicts an exploded perspective view of the device of the invention.

FIG. 1 depicts the components making up the locking device for a lock according to the invention.

The device comprises a box (1) and a cover (2), such that the components can be isolated. On one hand, the box (1) has therein a motor (3) which, when powered, causes a worm screw (4) which is assembled on the shaft of the motor (3) to rotate.

On the other hand, the box (1) also houses therein a locking shaft (5) and an elastic element (6) to which it is associated.

The elastic element (6) has a curved sheet configuration with one end being securely connected to the locking shaft (5), while the other end being inserted between two threads of the worm screw (4).

In the figures, the device has been depicted with the cover (2) not assembled in order to view the distribution and location of the components.

Figure 2:
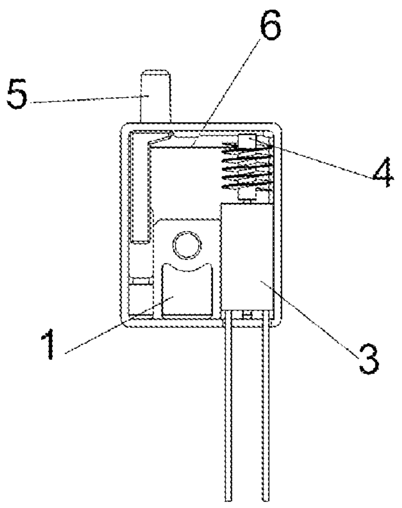
FIG. 2 depicts an elevational view of the device without the cover, to enable viewing the components located therein, in a locking position, with the locking shaft extended.

FIG. 2 depicts the locking device in an activated state, with the locking shaft (5) extended.

Figure 3:
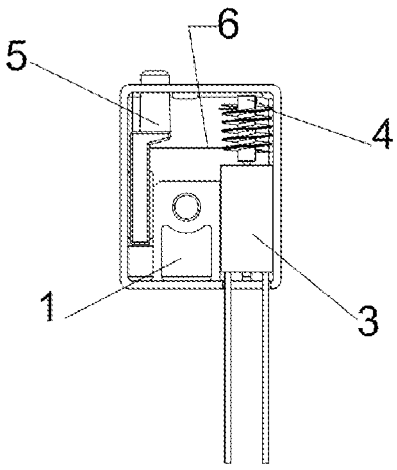
FIG. 3 depicts the view of FIG. 2 in a released position, with the locking shaft retracted.

FIG. 3 depicts the locking device in a deactivated state, with the locking shaft (5) retracted.

The operation of the device is as described below.

With the locking shaft (5) extended in the activated state as depicted in FIG. 2, energy is sent to the motor (3) when the device is activated, the worm screw (4) is activated, driving the elastic element (6) which in turn drives the locking shaft (5) to the position depicted in FIG. 3, with the locking shaft (5) transitioning to a deactivated state.

When the motor (3) rotates in the opposite direction, the movement is reversed, with the worm screw (4) rotating in the opposite direction and the elastic element (6), together with the locking shaft (5), returning to the extended position, being in the activated state.

In addition to these forward and backward movements of the locking shaft (5) depending on the rotation of the motor (3), during the normal operation of the device, two anomalies may occur during operation.

A first anomaly may occur when, with the locking shaft (5) in the extended position in the activated state, a shear force (F) acts on it and blocks it, so that it cannot be driven by the elastic element (6) when the worm screw (4) rotates upon activating the motor (3).

Figure 4:
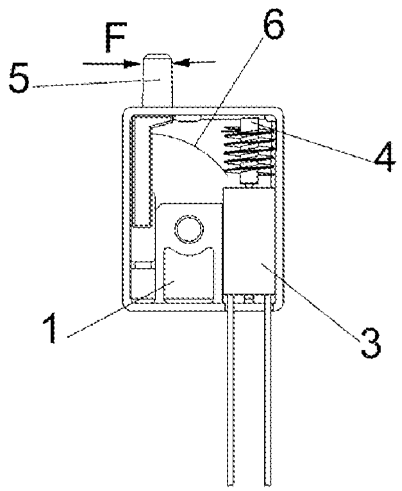
FIG. 4 depicts the view of FIG. 2 in a locking position, in which the locking shaft is subjected to a force and is unable to retract.

This situation is depicted in FIG. 4. When the worm screw (4) activated by the motor (3) begins to rotate from a position such as the one shown in FIG. 2, the end of the elastic element (6) in contact with the locking shaft (5) remains immobile, whereas the end of the elastic element (6) in contact with the worm screw (4) moves to the end-of-travel position, as it is not retained by any force. In this situation, the elastic element (6) is subjected to a bending force which causes it to bend.

When the shear force (F) on the locking shaft (5) ceases, the elastic element (6) drives it towards the retracted position in order to transition to the deactivated state, until the bending force on the elastic element (6) disappears.

The second anomaly occurs when the locking shaft (5), being in the retracted position in the deactivated state, is subjected to an axial force (Z) and cannot advance to the extended position once the motor (3) is activated.

Figure 5:
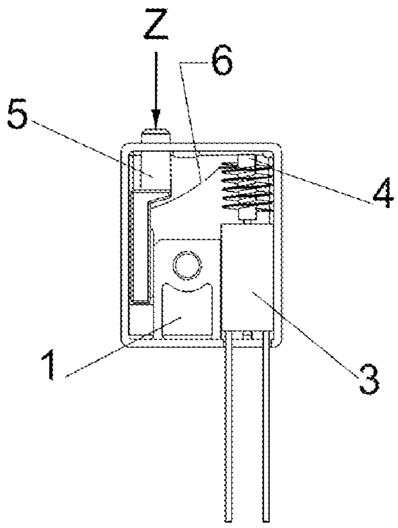
FIG. 5 depicts the view of FIG. 3 in a released position, in which the locking shaft is subjected to a force and is unable to extend.

This situation is depicted in FIG. 5. When the worm screw (4) activated by the motor (3) begins to rotate from a position such as the one shown in FIG. 3, the end of the elastic element (6) in contact with the locking shaft (5) remains immobile, whereas the end of the elastic element (6) in contact with the worm screw (4) moves to the end-of-travel position, as it is not retained by any force. In this situation, the elastic element (6) is subjected to a bending force which also causes it bend, as in the preceding case.

As in the preceding case, when the axial force (Z) on the locking shaft (5) ceases, the elastic element (6) drives it towards the extended position in order to transition to the activated state, until the bending force on the elastic element (6) disappears.

Lastly, it must be taken into account that the present invention must not be limited by the embodiment described herein. Other configurations may be carried out by those skilled in the art based on the present description. Accordingly, the scope of the invention is defined by the following claims.

The invention claimed is:

1. A locking device for a lock comprising a box and a cover, such that the device can be isolated, wherein the box comprises therein:

a motor;

a worm screw connected to a shaft of the motor;

a locking shaft which is capable of sliding through a hole towards the outside of the box; and an elastic element with two ends, connecting the locking shaft with the worm screw, wherein one end of the elastic element is securely connected to the locking shaft whereas the other end is inserted between two threads of the worm screw, such that, upon activating the motor, the worm screw rotates, moving the elastic element which in turn drives the locking shaft, which transitions from a retracted position to an extended position, and vice versa.

2. The locking device for a lock according to claim 1, wherein the elastic element has a curved sheet configuration.

3. The locking device for a lock according to claim 1, wherein the elastic element is a spring.

* * * * *